(12) United States Patent
Maeda

(10) Patent No.: US 8,643,911 B2
(45) Date of Patent: Feb. 4, 2014

(54) IMAGE READING DEVICE HAVING IMAGE SENSOR

(75) Inventor: Takashi Maeda, Nagoya (JP)

(73) Assignee: Brother Kogyo Kabushiki Kaisha, Nagoya-Shi Aichi-Ken (JP)

(*) Notice: Subject to any disclaimer, the term of this patent is extended or adjusted under 35 U.S.C. 154(b) by 1038 days.

(21) Appl. No.: 12/630,165

(22) Filed: Dec. 3, 2009

(65) Prior Publication Data

US 2010/0165424 A1 Jul. 1, 2010

(30) Foreign Application Priority Data

Dec. 25, 2008 (JP) ................................. 2008-330058

(51) Int. Cl.
*H04N 1/04* (2006.01)

(52) U.S. Cl.
USPC ........... 358/474; 358/496; 358/497; 358/498; 358/461

(58) Field of Classification Search
None
See application file for complete search history.

(56) References Cited

U.S. PATENT DOCUMENTS

| | | | | |
|---|---|---|---|---|
| 5,126,791 | A * | 6/1992 | Kurihara | 399/72 |
| 6,606,464 | B2 * | 8/2003 | Asakawa | 399/51 |
| 6,771,397 | B2 * | 8/2004 | Hashizume | 358/474 |
| 6,963,430 | B2 * | 11/2005 | Matsui | 358/486 |
| 7,755,814 | B2 * | 7/2010 | Tamai et al. | 358/497 |
| 7,782,498 | B2 * | 8/2010 | Hoshi | 358/474 |
| 7,969,623 | B2 * | 6/2011 | Kagami et al. | 358/498 |
| 8,184,345 | B2 * | 5/2012 | Inage | 358/448 |
| 2002/0149802 | A1 * | 10/2002 | Aoki | 358/461 |
| 2010/0073737 | A1 * | 3/2010 | Honda et al. | 358/474 |

FOREIGN PATENT DOCUMENTS

| | | | |
|---|---|---|---|
| JP | 57-49589 | | 3/1982 |
| JP | 10-312030 | | 11/1998 |
| JP | H11-136454 A | | 5/1999 |
| JP | 2000-101791 | | 4/2000 |
| JP | 2005-065078 | | 3/2005 |
| JP | 2005065078 A | * | 3/2005 |
| JP | 2005-184720 A | | 7/2005 |
| JP | 2005184720 A | * | 7/2005 |
| JP | 2007-049241 A | | 2/2007 |

OTHER PUBLICATIONS

Japanese Official Action mailed Nov. 18, 2010, together with partial English-language translation.

* cited by examiner

*Primary Examiner* — Cheukfan Lee
(74) *Attorney, Agent, or Firm* — Scully, Scott, Murphy & Presser, P.C.

(57) ABSTRACT

The image reading device includes a first document member, a white reference plate, an image sensor, a conveying section, and a control section. A first document is placed on the first document member. The image sensor reads the first document placed on the first document member. The conveying section conveys the image sensor in a first direction and a second direction opposite to the first direction. The image sensor reads the first document while being moved in the first direction. The control section executes a first control. The first control executes a process to control the image sensor to read the white reference plate, to control the conveying section to move the image sensor in the second direction, to control the conveying section to start moving the image sensor in the first direction, and to control the image sensor to read the first document, in this order.

11 Claims, 6 Drawing Sheets

Fig. 4

| NUMBER OF COLOR | RESOLUTION [dpi] | TARGET SPEED [mm/sec] | ACCELERATION DISTANCE [mm] | MOVING DISTANCE |
|---|---|---|---|---|
| MONOCHROME | 100 | 120 | 10.0 | 5.0 |
| | 200 | 120 | 10.0 | 5.0 |
| | 300 | 120 | 10.0 | 5.0 |
| | 400 | 60 | 5.0 | 0.0 |
| | 600 | 40 | 3.3 | 0.0 |
| | 1200 | 20 | 1.7 | 0.0 |
| COLOR | 100 | 95 | 7.9 | 2.9 |
| | 200 | 40 | 3.3 | 0.0 |
| | 300 | 40 | 3.3 | 0.0 |
| | 400 | 20 | 1.7 | 0.0 |
| | 600 | 20 | 1.7 | 0.0 |
| | 1200 | 10 | 0.9 | 0.0 |

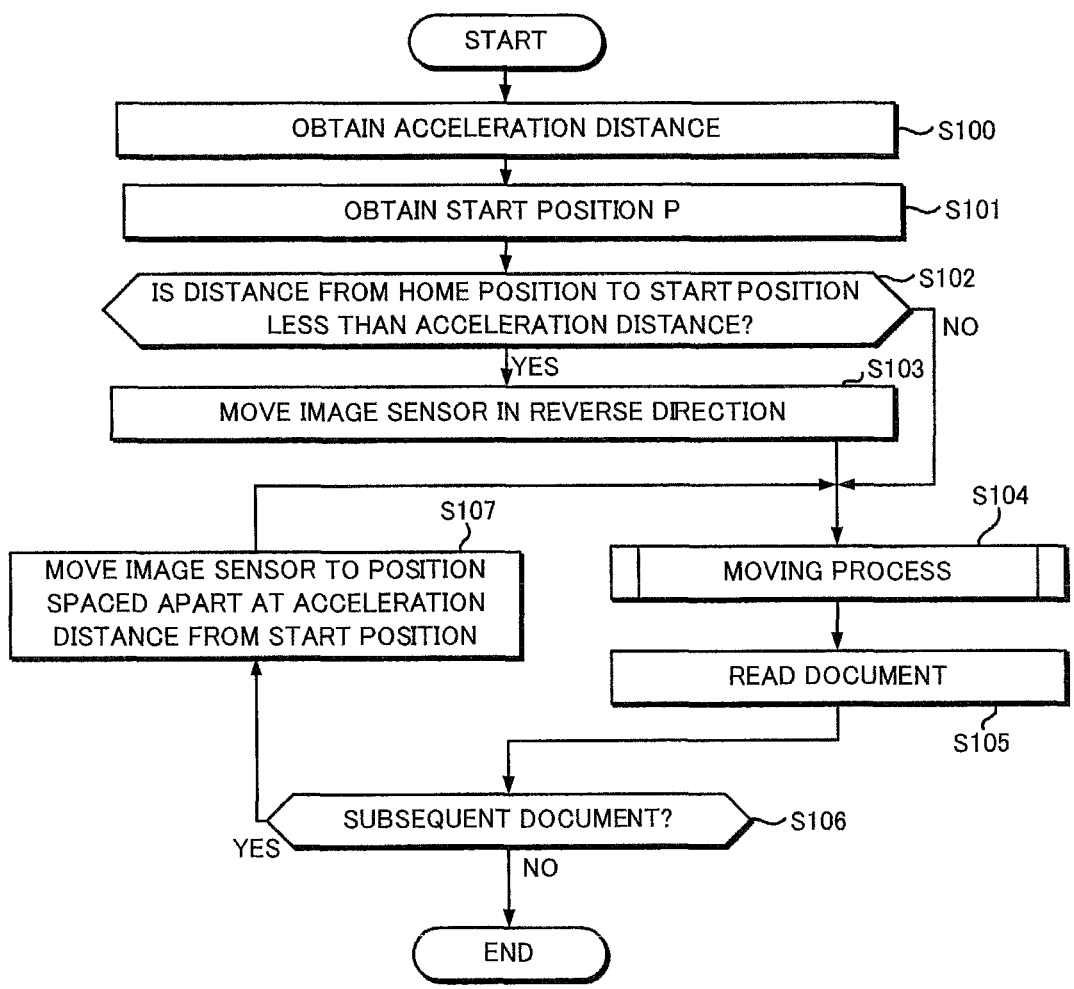

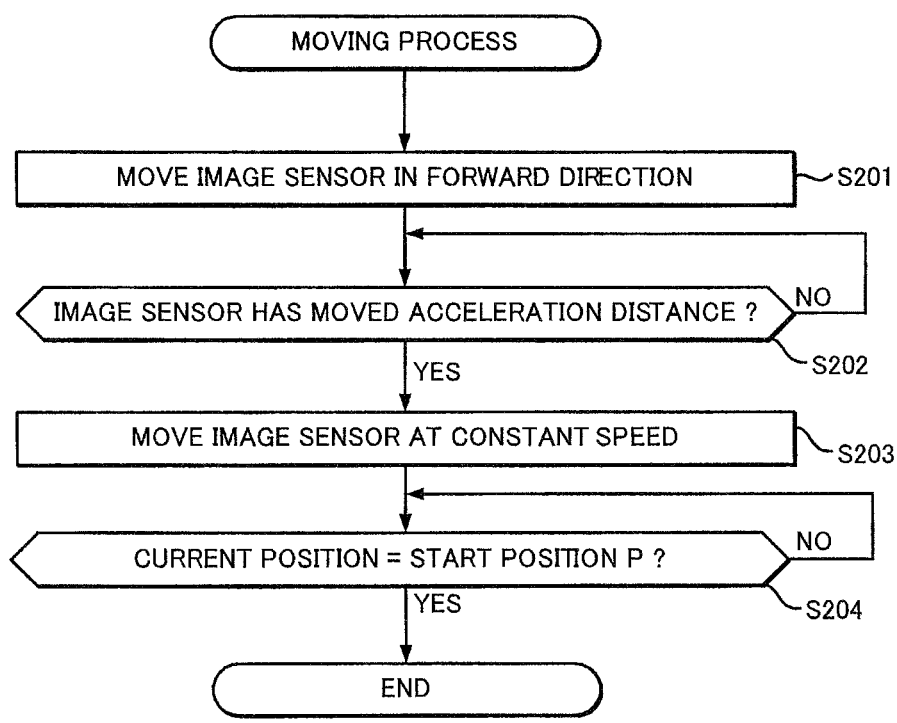

IMAGE READING DEVICE HAVING IMAGE SENSOR

CROSS REFERENCE TO RELATED APPLICATION

This application claims priority from Japanese Patent Application No. 2008-330058 filed Dec. 25, 2008. The entire content of the priority application is incorporated herein by reference.

TECHNICAL FIELD

The present invention relates to an image reading device having an image sensor.

BACKGROUND

It has been well known that an image sensor of a conventional image forming device starts running from a home position, accelerates its running speed to reach a target speed, and scans a reading region of a document from a start position while running at the target speed.

SUMMARY

However, in such a conventional image reading device, a sufficient distance is needed from a home position to a start position in order to accelerate the speed of an image sensor to a target speed by the time the image sensor reaches the start position. If a position for reading a white reference plate is used as the home position, a distance from the white reference plate to the start position should be secured so that the image sensor can accelerate its running speed to the target speed prior to reaching the start position. Hence, a problem arises that the white reference plate has positional constraint.

In view of the foregoing, it is an object of the invention to provide the image reading device with improved positional flexibility of the white reference plate, while enabling to accelerate a speed of the image sensor to the target speed before the image sensor reaches the start position for reading a document.

In order to attain the above and other objects, the invention provides an image reading device. The image reading device includes a first document member, a white reference plate, an image sensor, a conveying section, and a control section. A first document is placed on the first document member. The image sensor is configured to read an image on the first document placed on the first document member and the white reference plate. The conveying section is configured to convey the image sensor selectively in a first direction parallel with the first document member and a second direction opposite to the first direction. The image sensor reads the image on the first document while being moved in the first direction. The control section is configured to execute a first control. The first control executes a process to control the image sensor to read the white reference plate at a first position, a process to control the conveying section to move the image sensor a moving amount from the first position to a second position in the second direction, a process to control the conveying section to start moving the image sensor in the first direction, and a process to control the image sensor to read the image on the first document, in this order.

BRIEF DESCRIPTION OF THE DRAWINGS

The particular features and advantages of the invention as well as other objects will become apparent from the following description taken in connection with the accompanying drawings, in which:

FIG. 4 is a table showing correspondence between reading conditions and acceleration distances according to the embodiment;

FIG. 5 is a flowchart illustrating steps in a reading process according to the embodiment; and FIG. 6 is a flowchart illustrating steps in a moving process according to the embodiment.

DETAILED DESCRIPTION

An image scanner 1 according to an embodiment of the present invention will be described while referring to FIGS. 1 to 6. In the following description, the expressions "front", "rear", "right", "left", "above", "below" and the like are used to define the various parts when the image scanner 1 is disposed in an orientation in which it is intended to be used (the state shown in FIG. 1).

(1) Configuration of Image Scanner

Figure 1:
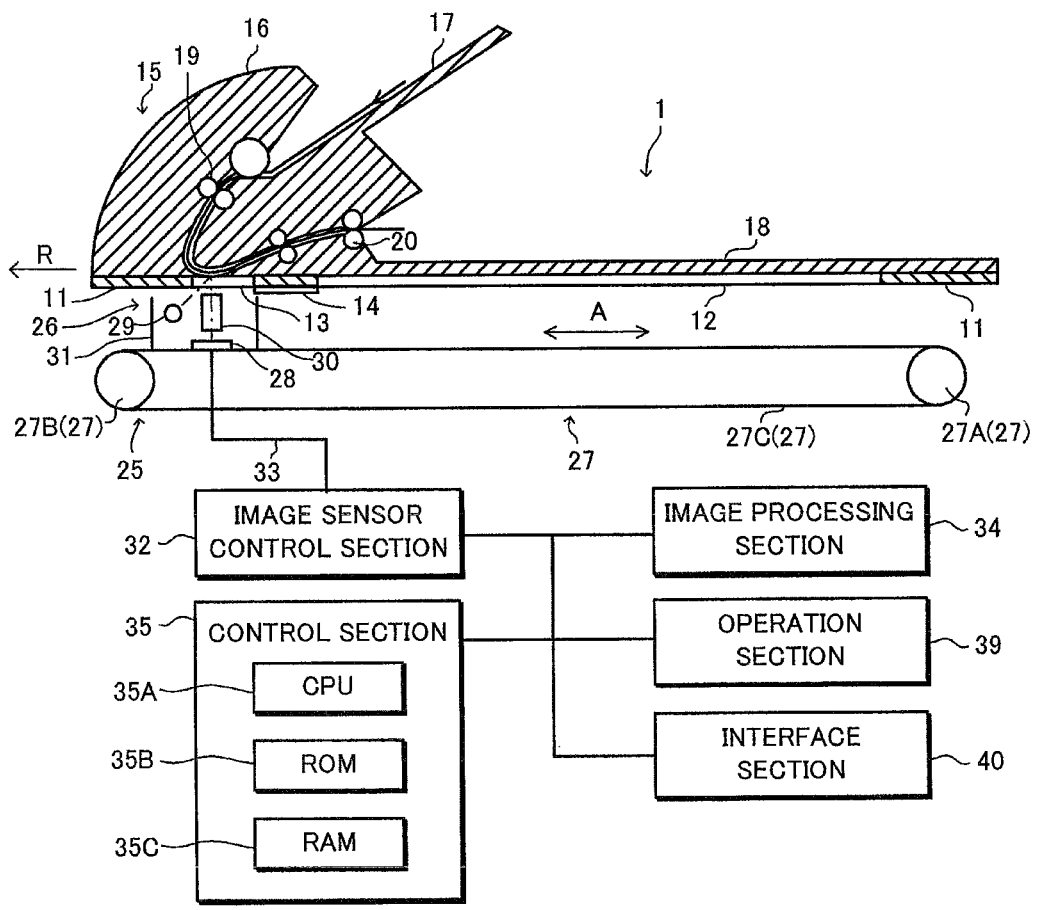
FIG. 1 is a schematic view of an image reading device in combination with a block diagram thereof according to an embodiment of the present invention.

As shown in FIG. 1, the image scanner 1 mainly includes a casing 11, a white reference plate 14, a document cover 15, a reading section 25, an image sensor control section 32, an image processing section 34, a control section 35, an operation section 39, and an interface section 40.

The casing 11 is formed substantially in a box shape. The casing 11 has in an upper portion thereof a first platen glass 12 and a second platen glass 13 juxtaposed in a rear-to-front direction.

The white reference plate 14 is a white colored plate-like member with high reflectance. The white reference plate 14 is disposed between the first platen glass 12 and the second platen glass 13 and extends in a widthwise direction (right-to-left direction) perpendicular to the rear-to-front direction.

The document cover 15 is connected to the casing 11 so as to be pivotally movable between a closed position for covering the first platen glass 12 and an open position for exposing the first platen glass 12. The document cover 15 is provided with an automatic document feeder (ADF) 16, a document tray 17, and a discharge tray 18.

The ADF 16 is provided with various rollers including a pair of feeding rollers 19, a pair of discharge rollers 20, and a motor (not shown) to drive these rollers. The ADF 16 automatically feeds a document placed on the document tray 17 on a sheet-by-sheet basis. Each sheet fed by the ADF 16 passes over the second platen glass 13 and then discharge on the discharge tray 18.

The reading section 25 includes a reading unit 26 and a moving mechanism 27 that reciprocatingly moves the reading unit 26 in an auxiliary scanning direction A parallel to a broad surface of the first platen glass 12.

The reading unit 26 includes an image sensor 28 having a plurality of light receiving elements (not shown) arranged in the widthwise direction, a light source 29 having light emitting diodes of three colors RGB, a rod lens array 30 for focusing the reflected light from the document on each light receiving element of the image sensor 28, and a carriage 31 on which the image sensor 28, the light source 29 and the rod lens array 30 are mounted.

The image sensor 28 reads the white reference plate 14 while the light source 29 is ON, and outputs a corresponding pixel signal, based on which a white reference value is generated. The white reference value is used to adjust a light amount of the light source 29 and to compensate for shading.

The moving mechanism 27 includes a drive gear 27A, a follower gear 27B, a timing belt 27C stretched around the drive gear 27A and the follower gear 27B, a stepping motor (not shown), and a transmission mechanism (not shown) that transmits a rotational driving force from the stepping motor to the drive gear 27A. When reading an image on a document placed on the first platen glass 12, the moving mechanism 27 moves the image sensor 28 (the reading unit 26) in the auxiliary scanning direction A. However, when reading an image on a document fed by the ADF 16 and past the second platen glass 13, the moving mechanism 27 places the image sensor 28 at a position in confrontation with the second platen glass 13, that is, a position immediately below the second platen glass 13. The moving mechanism 27 can move the image sensor 28 at least 5 mm from the white reference plate 14 in a reverse direction R (i.e., toward the front away from the first plate glass 12).

The image sensor control section 32 is configured as an ASIC (application specific integrated circuit), and is connected to the reading section 25 via a flexible flat cable 33. The image sensor control section 32 controls the reading unit 26 and the moving mechanism 27 of the reading section 25. Further, the image sensor control section 32 executes various processes, such as gain adjustment and analog-to-digital conversion, on image data outputted from the image sensor 28.

The image processing section 34 is configured as an ASIC, and executes various processes, such as gamma correction, shading compensation, noise reduction, color balance adjustment, enlargement/reduction, and color space conversion, on image data outputted from the image sensor control section 32.

The control section 35 includes a central processing unit (CPU) 35A, a read only memory (ROM) 35B, and a random access memory (RAM) 35C. The control section 35 controls respective sections of the image scanner 1. The ROM 35B stores various programs to be executed by the CPU 35A and a table 50 described later (refer to FIG. 4).

Although not shown in the drawings, the operation section 39 includes a plurality of buttons and a liquid crystal display (LCD). A user can set the reading condition of the image scanner 1 and enter reading instructions by pressing the buttons while referring to a screen displayed on the LCD.

The interface section 40 may be a Universal Serial Bus (USB) interface, a network interface, or the like.

(2) Outline of Movement of Image Sensor

Here, an example of movement of the image sensor 28 will be described. In this example, the image sensor 28 is first moved in the reverse direction R from a home position, and then moved in a forward direction opposite to the reverse direction R.

Figure 2A:
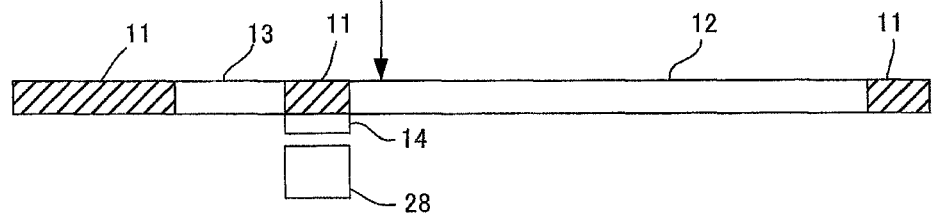
FIG. 2A is an explanatory diagram showing an image sensor at a home position according to the embodiment.

As shown in FIG. 2A, in the present embodiment, the home position is set to a position directly underneath the white reference plate 14 where the image sensor 28 can read the white reference plate 14, and the image sensor 28 stays at the home position in a standby state. If the user instructs the image scanner 1 to read a document placed on the first platen glass 12, the control section 35 initially controls the image sensor 28 to read the white reference plate 14.

Figure 2B:
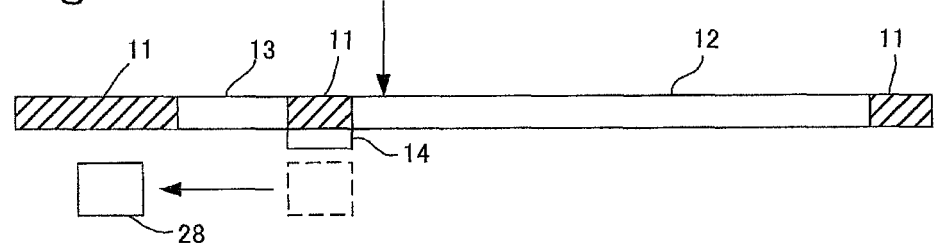
FIG. 2B is an explanatory diagram showing the image sensor moved in a reverse direction according to the embodiment.
Figure 2C:
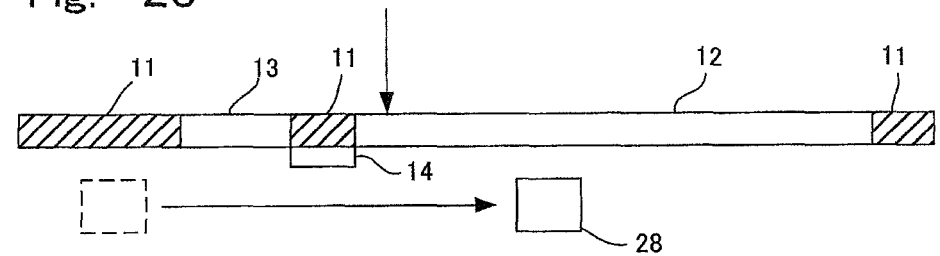
FIG. 2C is an explanatory diagram showing the image sensor accelerated in a forward direction according to the embodiment.

Then, the control section 35 moves the image sensor 28 in the reverse direction R as shown in FIG. 2B. Then, the control section 35 starts moving the image sensor 28 in the forward direction as shown in FIG. 2C.

More specifically, the control section 35 accelerates a speed of the image sensor 28 to a target speed in the forward direction. After reaching the target speed, the speed of the image sensor 28 is maintained constant.

A start position P is a position where the image sensor 28 starts reading a document placed on the first platen glass 12. The control section 35 controls the image sensor control section 32 to start reading the document with the image sensor 28 when the image sensor 28 reaches the start position P.

(3) Acceleration Distance and Target Speed

In the present embodiment, the "acceleration distance" denotes a distance necessary for accelerating the speed of the image sensor 28 in a resting state from 0 (zero) speed to the target speed. In other words, the acceleration distance is a distance from a position where the image sensor 28 starts moving in the forward direction to the start position P.

Figure 3A:
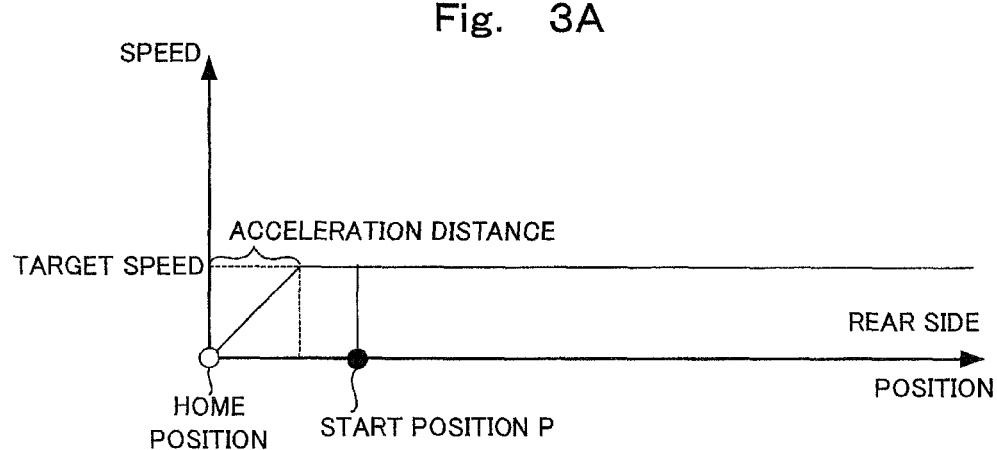
FIG. 3A is a graph showing a relationship between a position of the image sensor and a moving speed thereof according to the embodiment.

In FIG. 3A, the target speed is relatively slow, so the acceleration distance can be secured between the home position and the start position P. Thus, the image sensor 28 started moving in the forward direction from the home position can reach the target speed before reaching the start position P.

Figure 3B:
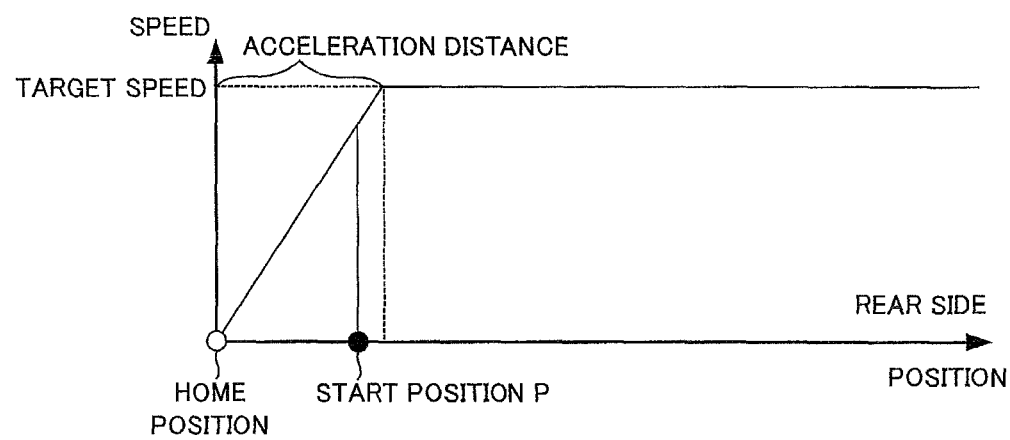
FIG. 3B is a graph showing a relationship between the position of the image sensor and the moving speed thereof according to an example for comparison.

In FIG. 3B, the target speed is faster than the target speed shown in FIG. 3A, and the acceleration distance is not secured between the home position and the start position P. Thus, the image sensor 28 started moving in the forward direction from the home position does not reach the target speed before reaching the start position P, but reaches the target speed after moved past the start position P. In this case, a resolution of image data read by the image sensor 28 before reaching the target speed differs from a resolution of image data read by the image sensor 28 moved at the target speed, thereby degrading image quality.

Figure 3C:
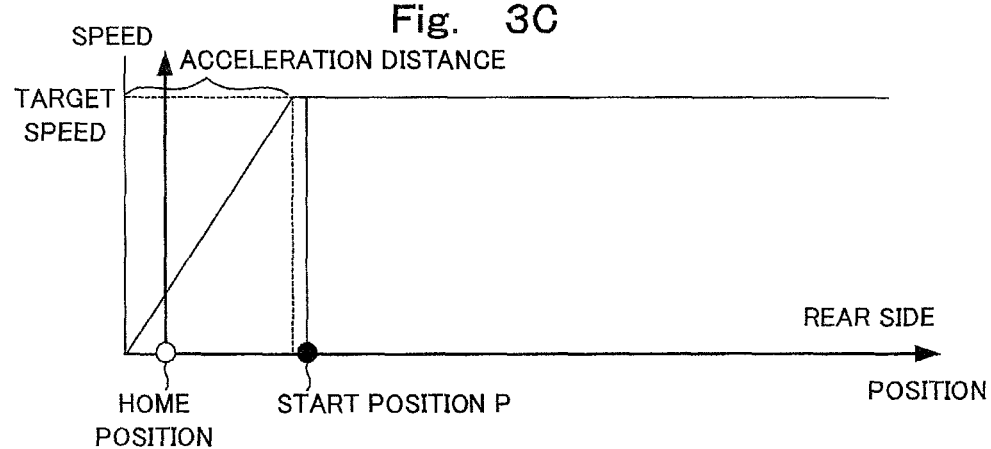
FIG. 3C is a graph showing a relationship between the position of the image sensor and the moving speed thereof according to the embodiment.

The target speed shown in FIG. 3C is the same as that shown in FIG. 3B. However, in FIG. 3C, the image sensor 28 is initially moved in the reverse direction R from the home position, and then moved in the forward direction. As a result, the acceleration distance is secured between a position where the image sensor 28 starts moving in the forward direction and the start position P. Thus, although the target speed in FIG. 3C is the same as that in FIG. 3B, the speed of the image sensor 28 can reach the target speed before reaching the start position P.

By moving the image sensor 28 in the reverse direction R before moving in the forward direction in this manner, the speed of the image sensor 28 can reach the target speed before the image sensor 28 reaches the start position P even if the acceleration distance cannot be secured between the home position and the start position P.

(4) Reading Condition and Acceleration Distance

In the present embodiment, if the acceleration distance cannot be secured between the home position and the start position P, the image sensor 28 is moved in the reverse direction R such that a distance from the image sensor 28 to the start position P is greater than or equal to the acceleration distance.

The target speed varies depending on the reading condition for reading the document, and the control section 35 controls the image sensor 28 to move at the target speed appropriate for the reading condition. Different target speeds have different acceleration distances. When the target speed is slower, the acceleration distance is shorter. When the target speed is higher, the acceleration distance is longer.

The image scanner 1 stores the table 50 shown in FIG. 4. The table 50 shows correspondence between the reading conditions and the acceleration distances. In the table 50, the number of colors and the resolution are exemplified as the reading condition. The distance from the home position to the start position P is set to 5 mm in this example.

Either "monochrome" or "color" can be designated as the number of color. Degradation of the image quality is less noticeable in monochromatic compared to in color, when the image sensor 28 reads the document while moving at a relatively high speed. Thus, if the resolution is the same, the target speed is set faster when the document is read in monochrome, and the target speed is set slower when the document is read in color.

The resolution can be set any one of "100 dpi", "200 dpi", "300 dpi", "400 dpi", "600 dpi", and "1200 dpi". In general, when reading the document at a higher resolution, the image sensor 28 needs to be moved at a lower speed.

When reading the document at a lower resolution, the image sensor 28 can be moved at a higher speed. Thus, the target speed is set faster for a lower resolution and set lower for a higher resolution, when reading in the same number of color. For example, when reading an image in monochrome at the resolution of 300 dpi or less, the image sensor 28 is moved in the reverse direction R to secure the acceleration distance.

Similarly, when reading the image in color at the resolution of 100 dpi, the image sensor 28 is moved in the reverse direction R. However, when reading an image in monochrome at the resolution of more than 300 dpi or reading an image in color at the resolution of more than 100 dpi, the image sensor is moved directly in the forward direction without moving in the reverse direction R.

As described above, the target speed is a moving speed of the image sensor 28 for reading the document. In the present embodiment, when the target speed is set to 95 mm/sec or higher, the image sensor 28 is moved in the reverse direction R to secure the acceleration distance. When the target speed is set to lower than 95 mm/sec, the image sensor 28 is moved directly in the forward direction from the home position.

The acceleration distance is, as described above, a distance necessary for accelerating the moving speed of the image sensor 28 to the target speed corresponding to the reading condition. The acceleration distance is set shorter for a lower target speed, and is set longer for a higher target speed.

A moving distance denotes a distance for moving the image sensor 28 in the reverse direction R from the home position in order to secure the acceleration distance. The moving distance can be calculated by deducting 5 mm, that is, the distance from the home position to the start position P, from the acceleration distance. The moving distance is shorter for a lower target speed because a shorter acceleration distance is applied to a lower target speed.

The moving distance is set to 0 (zero) when the acceleration distance is 5 mm or less because the distance between the home position and the start position P is set to 5 mm in this example.

(5) Change of Start Position P

As described above, the distance from the home position to the start position P is set to 5 mm. However, in the present embodiment, the user can arbitrarily change the start position P in the manner described next.

Although not shown in the drawings, the image scanner 1 is connected to a personal computer (PC) through the interface section 40 via a USB. Installing a scanner driver in the PC, a user can control the image scanner 1 through the PC. The user can set the location of the start position P on a display unit of the PC. The type of connection between the PC and the image scanner 1 is not limited to the USB connection, but the other type of connection can be used.

For example, the user places the document on an arbitrary position of the first platen glass 12, and operates the PC to control the image scanner 1 to execute a pre-scan. As a result, the image scanner 1 pre-scans over the entire of the first platen glass 12 to generate an image data, and outputs the image data to the PC. The PC displays the image data on the display unit.

Then, the user can set the start position P on the display unit such that reading of the document can start from a top end portion of the document. When the user changes the start position P, the distance from the home position to the start position P is accordingly changed. The user can set the start position P to a desired position, but the distance from the start position P to the home position should not be less than 5 mm. Note that, the user may set the location of the start position P via the operation section 39 instead of the PC.

(6) Reading Process of Document (6-1) Overall Process

A reading process for reading a document placed on the first platen glass 12 will be described with reference to the flowchart of FIG. 5. The reading process is started when a user instructs the image scanner 1 to read the document, after the user operates the operation section 39 to designate the reading condition and the display unit or the operation section 39 to set the start position P.

As shown in FIG. 5, in S100, the control section 35 obtains from the table 50 the acceleration distance corresponding to the designated reading condition.

In S101, the control section 35 obtains the start position P set via the operation section 39 or the display unit of the PC. Also in S101, the control section 35 controls the image sensor 28 to read the white reference plate 14 at the home position in order to adjust the light amount of the light source 29.

In S102, the control section 35 determines whether the distance from the home position to the start position P is less than the acceleration distance obtained in S100. The distance from the home position to the start position P is set to 5 mm unless the user changes the start position P. If the user has changed the location of the start position P, the distance from the home position to the start position P is changed accordingly. If the distance from the home position to the start position P is less than the obtained acceleration distance (S102: YES), then the control section 35 advances to S103. On the other hand, if the distance from the home position to the start position P is greater than or equal to the obtained acceleration distance (S102: NO), then the control section 35 advances to S104.

In S103, the control section 35 calculates the moving distance by deducting "the distance from the home position to the start position P" from the acceleration distance, and moves the image sensor 28 the calculated moving distance in the reverse direction R from the home position.

In S104, the control section 35 executes a moving process to be described later.

In S105, the control section 35 maintains the image sensor 28 at the constant speed and reads the document with the control sensor 28.

In S106, the control section 35 inquires the user whether there is a subsequent document to read. If the user inputs in the operation section 39 that there is a subsequent document to be read (S106: YES), then the control section 35 advances to S107. On the other hand, if the user inputs in the operation section 39 that there is no subsequent document to be read (S106: NO), then the control section 35 ends the reading process.

In S107, the control section 35 moves the image sensor 28 in the reverse direction R to a position spaced apart the acceleration distance from the start position P. More specifically, if a negative determination has been made in S102, then the control section 35 returns the image sensor 28 to the home position. However, if a positive determination has been made in S102, then the image sensor 28 is moved to the position where the image sensor 28 was moved in S103. Then, the control section 35 returns to S104 to repeat the above processes.

In the present embodiment, it is presumed that variability over time in the light amount of the light source 29 can be ignored, so the second and subsequent documents are read without reading the white reference plate 14. Accordingly, the light amount is not adjusted for reading the second or subsequent document, and the white reference value generated before reading the first document is also used for reading the second and subsequent documents.

(6-2) Moving Process

Next, the moving process executed in S104 of FIG. 5 will be described with reference to the flowchart of FIG. 6.

As shown in FIG. 6, in S201, the control section 35 starts moving the image sensor 28 in the forward direction.

In S202, the control section 35 accelerates the moving speed of the image sensor 28 in the forward direction at a constant rate, and determines at regular time intervals whether the image sensor 28 has moved the acceleration distance based on, for example, the number of pulse signals inputted to the stepping motor. If so (S202: YES), then the control section 35 advances to S203. On the other hand, if not (S202: NO), then the control section 35 keeps accelerating the moving speed of the image sensor 28, and determines whether the image sensor 28 has moved the acceleration distance again.

In S203, the control section 35 ends the acceleration, and moves the image sensor 28 at a constant speed. At this time, the speed of the image sensor 28 is substantially equivalent to the target speed corresponding to the designated reading condition.

In S204, the control section 35 determines whether a current position of the image sensor 28 is the start position P. If so (S204: YES), then the control section 35 ends the moving process. If not (S204: NO), the control section 35 re-determines after the elapse of a predetermined period of time.

(7) Effects of the Embodiment

According to the image scanner 1 in the present embodiment, after reading the white reference plate 14, the image sensor 28 is moved in the reverse direction R and then moved in the forward direction. Thus, the acceleration distance can be secured even if the distance from the white reference plate 14 to the start position P is relatively short. This improves positional flexibility of the white reference plate 14 and also enables the speed of the image sensor 28 to reach the target speed before the image sensor 28 reaches the start position P.

Further, according to the present embodiment, the white reference plate 14 is provided at a position between the first platen glass 12 and the second platen glass 13. It should be noted that a certain space needs to be defined between the first platen glass 12 and the second platen glass 13. If the white reference plate 14 is disposed such that the second platen glass 13 is interposed between the first platen glass 12 and the white reference plate 14, then the size of the image scanner 1 increases by the width of the white reference plate 14. However, in the present embodiment, because the white reference plate 14 is provided at the position between the first platen glass 12 and the second platen glass 13, the white reference plate 14 can be provided without increasing the size of the image scanner 1. Although this configuration makes a distance between the white reference plate 14 and the start position P shorter, the speed of the image sensor 28 can reach the target speed before the image sensor 28 reaches the start position P by moving the image sensor 28 in the reverse direction R before moving in the forward direction. Thus, according to the present embodiment, it is possible to provide the white reference plate 14 to the image scanner 1 having the first platen glass 12 and the second platen glass 13 without increasing the size of the image scanner 1 and also to reach the target speed before the image sensor 28 reaches the start position P.

Further, according to the present embodiment, the home position for the standby state is set to a position for reading the white reference plate 14. Thus, it is possible to shorten a duration of time from when the user instructs the image scanner 1 to read the document until when the image sensor 28 reads the white reference plate 14. Accordingly, the image scanner 1 can read the document in a shorter period of time.

Further, according to the present embodiment, the moving distance of the image sensor 28 in the reverse direction R is set based on the target speed. Because the moving distance can be shorter for a lower target speed, if a target speed is lower, then it is unnecessary to move the image sensor 28 in the reverse direction R to the extent of the moving distance for a higher target speed. Accordingly, the image scanner 1 can read the document in a shorter period of time compared to a case where the moving distance is set the same regardless of the target speed.

Further, according to the present embodiment, the moving distance varies depending on a distance from the white reference plate 14 to the start position P. Thus, the moving distance can be shortened if the distance from the white reference plate 14 to the start position P is longer. Accordingly, the image scanner 1 can read the document in a shorter period of time compared to a case where the moving distance is set the same regardless of the distance from the white reference plate 14 to the start position P.

Further, according to the present embodiment, if the acceleration distance is secured between the home position and the start position P, the image sensor 28 is directly moved in the forward direction from the home position without moved in the reverse direction R. Accordingly, the image scanner 1 can read the document in a shorter period of time.

Further, according to the present embodiment, when reading two or more documents, the image sensor 28 reads the documents without reading the white reference plate 14 except for a first document. After reading each document, the image sensor 28 is returned directly to a position from which the image sensor 28 starts moving in the forward direction, without stopping at the home position to read the white reference plate 14. Accordingly, the subsequent documents can be read in a shorter period of time.

Other Embodiments

While the invention has been described in detail with reference to the embodiment thereof, it would be apparent to those skilled in the art that various changes and modifications may be made therein without departing from the spirit of the invention.

In the above embodiment, the image scanner 1 includes the ADF 16. However, the present invention is applicable to an image scanner without the ADF 16 or the second platen glass 13.

In the above embodiment, the user can change the start position P. However, the image scanner 1 may be configured such that the start position P cannot be changed.

In the above embodiment, the image sensor 28 does not read the white reference plate 14 before reading each of the second and subsequent documents. However, the image sensor 28 may read the white reference plate 14 each time a predetermined number of documents are read.

In the above embodiment, the image scanner 1 has been described as the image reading device. However, the present invention is also applicable to a multifunction device having a scanner function, a copier function, and a facsimile function.

What is claimed is:

1. An image reading device comprising:
    a first document member on which a first document is placed;
    a white reference plate;
    an image sensor that is configured to read an image on the first document placed on the first document member and the white reference plate;
    a conveying section that is configured to convey the image sensor selectively in a first direction parallel with the first document member and a second direction opposite to the first direction, wherein the image sensor reads the image on the first document while being moved in the first direction;
    a control section that is configured to execute a first control, the first control executing a process to control the image sensor to read the white reference plate at a first position, a process to control the conveying section to move the image sensor a moving amount from the first position to a second position in the second direction, a process to control the conveying section to start moving the image sensor in the first direction, and a process to control the image sensor to read the image on the first document, in this order;
    an automatic document feeder that is configured to automatically feed a second document; and
    a second document member where the second document fed by the automatic document feeder passes,
    wherein the control section controls the conveying section to move the image sensor to a third position facing the second document member when reading an image on the second document, and
    wherein the white reference plate is interposed between the first document member and the second document member.

2. The image reading device according to claim 1, wherein the control section controls the conveying section to keep the image sensor at the first position in a standby state.

3. The image reading device according to claim 1,
    wherein the image sensor starts reading the image on the first document from a start position, and
    wherein the control section selectively executes the first control and a second control, and the control section executes the second control if a distance between the first position and the start position is longer than or equal to a prescribed distance, the second control executing a process to control the image sensor to read the white reference plate, a process to control the conveying section to start moving the image sensor in the first direction from the first position without moving the image sensor from the first position to the second position, and a process to control the image sensor to read the image on the first document, in this order.

4. The image reading device according to claim 3, wherein the prescribed distance is a distance that the conveying section requires to accelerate the image sensor from zero speed to a target speed that is determined based on a reading condition.

5. The image reading device according to claim 1, further comprising an operation section enabling a user to set a start position and a moving amount setting section that sets the moving amount, wherein the image sensor starts reading the image on the first document from the start position, and the moving amount setting section sets the moving amount to a shorter moving amount when a distance between the first position and the start position is longer.

6. The image reading device according to claim 1, further comprising an operation section through which a user designates a reading condition including a parameter, wherein the control section selectively executes the first control and a second control, and the control section executes the second control if the parameter is greater than a prescribed threshold value, the second control executing a process to control the image sensor to read the white reference plate, a process to control the conveying section to start moving the image sensor in the first direction from the first position without moving the image sensor from the first position to the second position, and a process to control the image sensor to read the image on the first document, in this order.

7. The image reading device according to claim 6, wherein the parameter is a resolution, and the image sensor reads the image on the first document with the resolution.

8. The image reading device according to claim 6, wherein the parameter is a number of colors, and the image sensor reads the image on the first document with the number of colors.

9. The image reading device according to claim 1, further comprising a moving amount setting section that sets the moving amount, wherein the image sensor reads the image while being moved at a target speed that is determined based on a reading condition, and the moving amount setting section sets the moving amount to a shorter moving amount when the target speed is lower.

10. The image reading device according to claim 1, wherein when reading an image on a subsequent first document placed on the first document member, the control section controls the conveying section to return the image sensor directly to the second position after completing the reading of the image on the first document.

11. The image reading device according to claim 1, further comprising:
    a first designation section for designating a start position where the image sensor starts reading the image on the first document;
    a second designation section for designating a number of colors with which the image sensor reads the image on the first document and a resolution with which the image sensor reads the image on the first document; and
    a storage section that stores an acceleration distance that the conveying section requires to accelerate the image sensor from zero speed to a target speed,
    wherein the control section executes a process to calculate a reference distance from the first position to the start position, a process to read out the acceleration distance corresponding to the number of colors and the resolution from the storage section, and a process to obtain the moving amount by deducting the reference distance from the acceleration distance.

* * * * *